United States Patent
Utsumi

(10) Patent No.: US 9,563,444 B2
(45) Date of Patent: Feb. 7, 2017

(54) IMAGE FORMING APPARATUS HAVING HIBERNATION FUNCTION ACCORDING TO DEVICE CONNECTION STATES, CONTROL METHOD THEREFOR, AND STORAGE MEDIUM

(71) Applicant: CANON KABUSHIKI KAISHA, Tokyo (JP)

(72) Inventor: Keiko Utsumi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 224 days.

(21) Appl. No.: 14/284,783

(22) Filed: May 22, 2014

(65) Prior Publication Data
US 2014/0359260 A1    Dec. 4, 2014

(30) Foreign Application Priority Data
May 28, 2013 (JP) ................................. 2013-111952

(51) Int. Cl.
G06F 9/44 (2006.01)
H04N 1/00 (2006.01)

(52) U.S. Cl.
CPC .......... G06F 9/4418 (2013.01); G06F 9/4401 (2013.01); H04N 1/00896 (2013.01)

(58) Field of Classification Search
CPC ..... G06F 9/4401; G06F 9/4406; G06F 9/4418
USPC ......................................................... 713/1, 2
See application file for complete search history.

(56) References Cited

U.S. PATENT DOCUMENTS

| 6,434,696 | B1* | 8/2002 | Kang ........................ G06F 1/24 713/2 |
| 8,788,746 | B2* | 7/2014 | Matsushima .......... G03G 15/50 707/639 |
| 8,819,403 | B2* | 8/2014 | Kim ....................... G06F 9/4418 713/2 |
| 9,065,953 | B2* | 6/2015 | Yokoyama ......... H04N 1/00896 |
| 2010/0037076 | A1* | 2/2010 | Reece .................... G06F 1/3203 713/324 |

(Continued)

FOREIGN PATENT DOCUMENTS

| JP | 2013004044 A | 1/2003 |
| JP | 2012018554 A | 1/2012 |

*Primary Examiner* — Chun Cao
(74) *Attorney, Agent, or Firm* — Rossi, Kimms & McDowell LLP

(57) ABSTRACT

An image forming apparatus which has a hibernation function and is capable of selecting a suitable startup method even in a case where device connection states are different at power-off and at next startup. A hibernation image created based on data stored in a memory of the image forming apparatus and a first device connection state indicative of whether the device is connected to the image forming apparatus are stored in a flash disk. After that, when power to the image forming apparatus is turned off and the power is turned on again, a second device connection state indicative of whether the device is connected to the image forming apparatus is obtained. When the first and second connection states are different, the image forming apparatus is started without using the hibernation image, and when they are the same, the image forming apparatus is started using the hibernation image.

12 Claims, 7 Drawing Sheets

(56) References Cited

U.S. PATENT DOCUMENTS

| | | | |
|---|---|---|---|
| 2010/0238507 A1* | 9/2010 | Matsushima | G03G 15/50 358/1.16 |
| 2012/0008165 A1* | 1/2012 | Tanaka | G06F 9/4418 358/1.15 |
| 2013/0124842 A1* | 5/2013 | Oh | H04N 1/00885 713/2 |
| 2013/0151878 A1* | 6/2013 | Miyata | G06F 1/3237 713/321 |
| 2013/0227325 A1* | 8/2013 | Konosu | G06F 1/3234 713/323 |

* cited by examiner

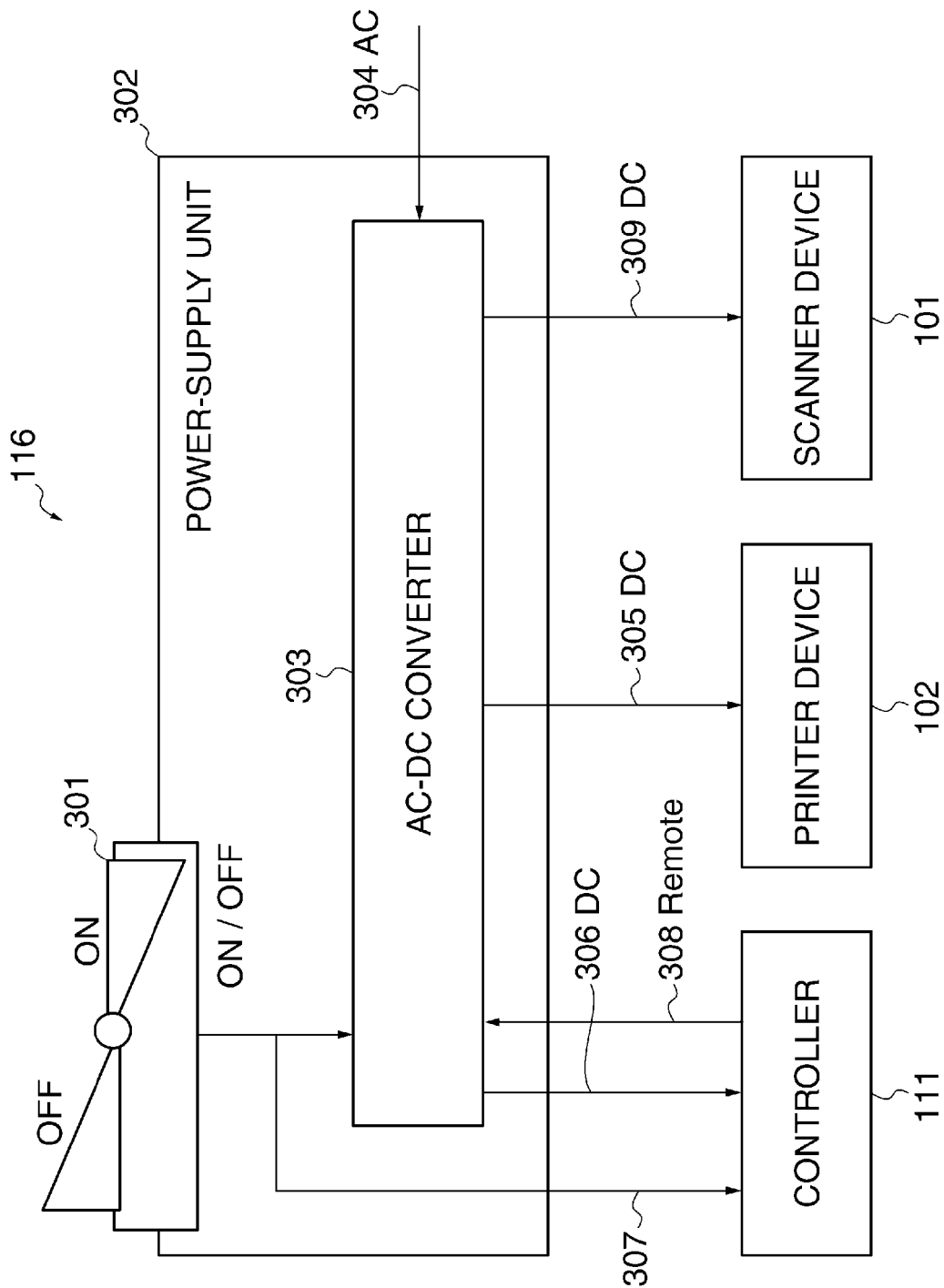

FIG. 4A

LAST TIME

| DEVICE | DISK1 | DISK2 | USB1 | USB2 | DRAM1 | DRAM2 | NIC1 |
|---|---|---|---|---|---|---|---|
| SERIAL NUMBER | FLASH111 | | MEMORY333 | | RAM555 | | NIC777 |

THIS TIME

| DEVICE | DISK1 | DISK2 | USB1 | USB2 | DRAM1 | DRAM2 | NIC1 |
|---|---|---|---|---|---|---|---|
| SERIAL NUMBER | FLASH111 | HDD222 | MEMORY333 | | RAM555 | RAM666 | NIC777 |

FIG. 4B

LAST TIME

| DEVICE | SCANNER | PRINTER | FACSIMILE |
|---|---|---|---|
| SERIAL NUMBER | SCAN111 | PRINT222 | |

THIS TIME

| DEVICE | SCANNER | PRINTER | FACSIMILE |
|---|---|---|---|
| SERIAL NUMBER | SCAN111 | PRINT222 | FAX333 |

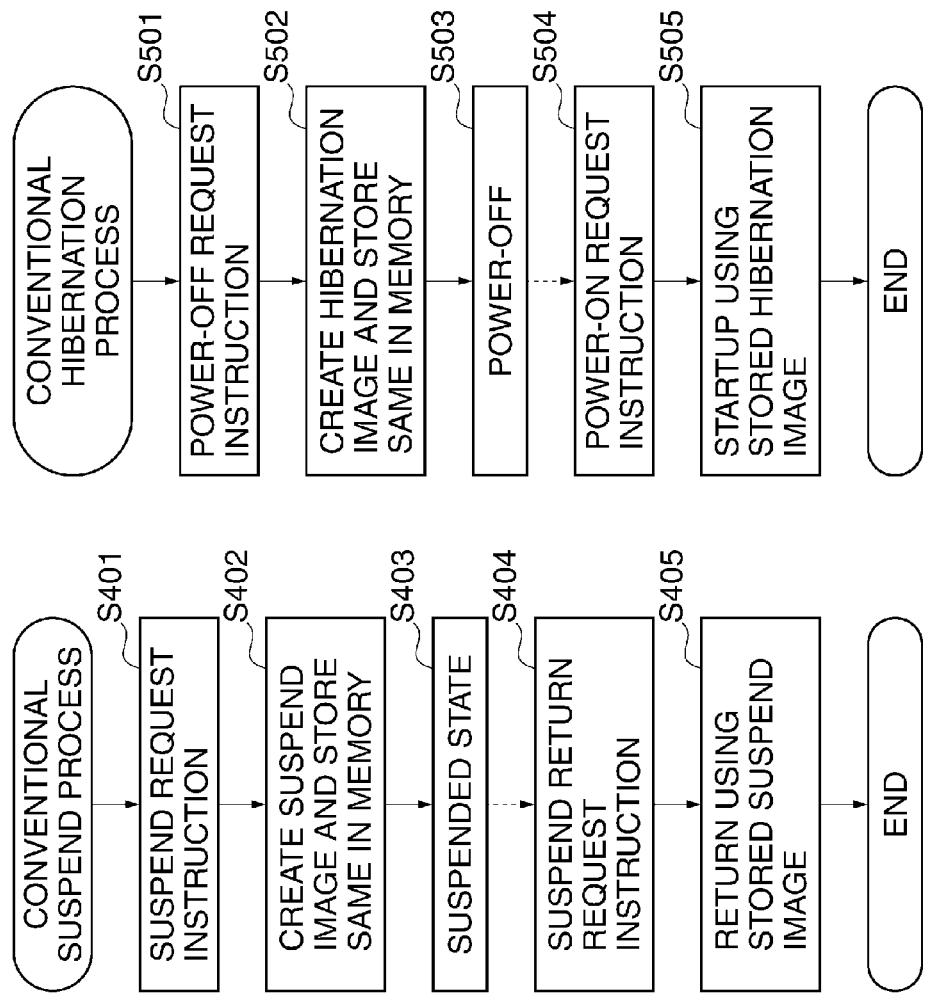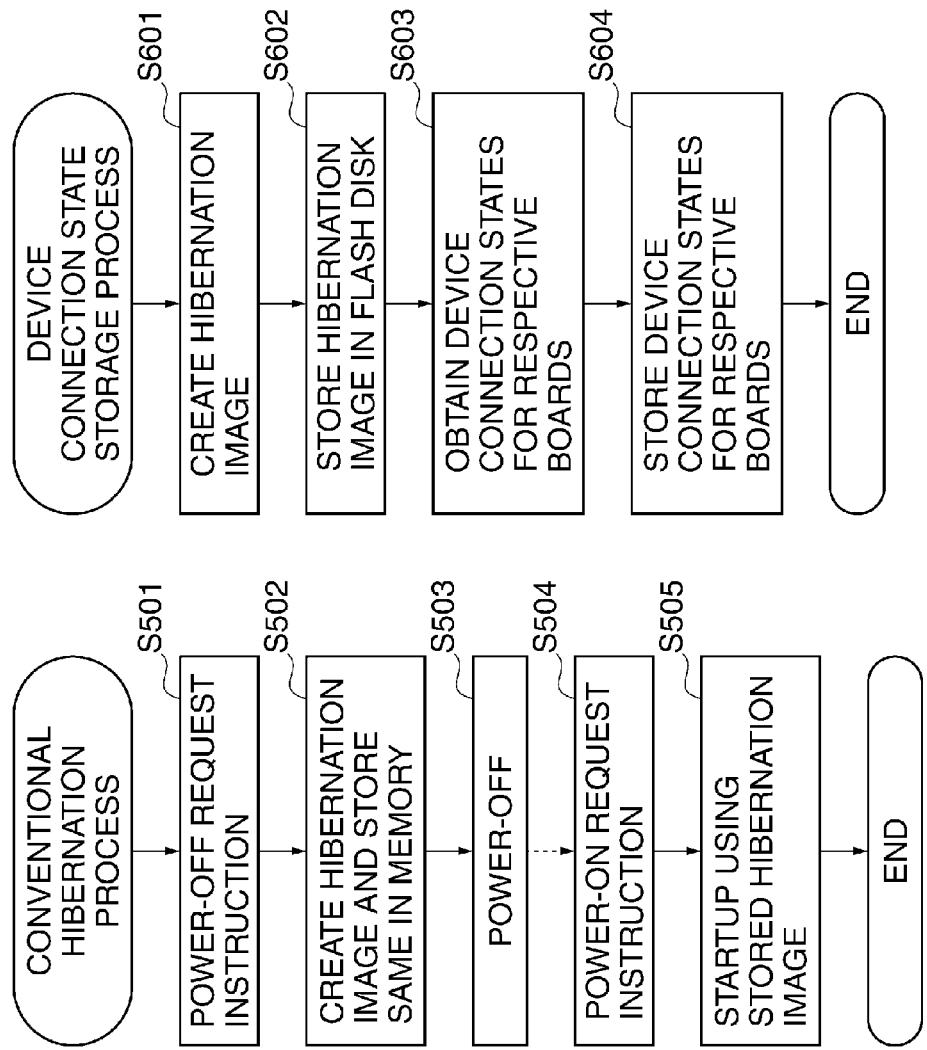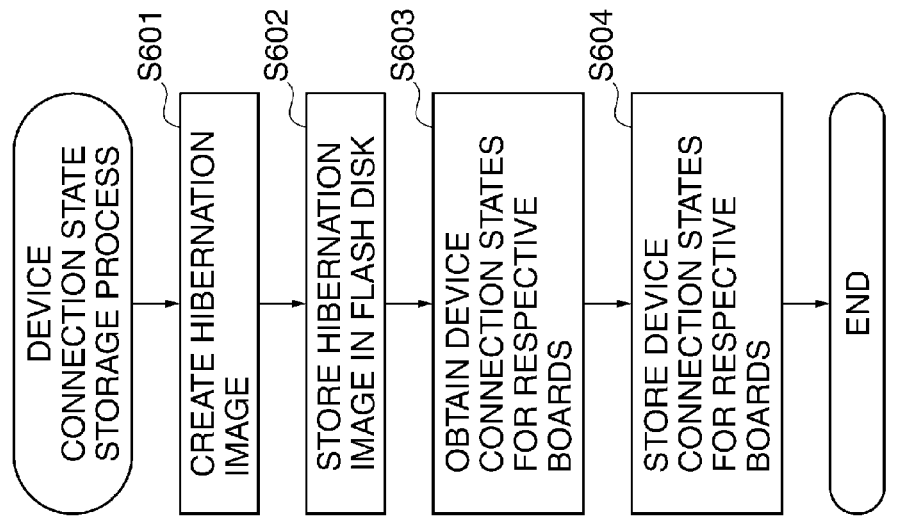

IMAGE FORMING APPARATUS HAVING HIBERNATION FUNCTION ACCORDING TO DEVICE CONNECTION STATES, CONTROL METHOD THEREFOR, AND STORAGE MEDIUM

BACKGROUND OF THE INVENTION

Field of the Invention

The present invention relates to an image forming apparatus, a control method therefor, and a computer-readable storage medium storing a program for implementing the control method.

Description of the Related Art

As an image forming apparatus becomes increasingly sophisticated, the time for the image forming apparatus to become operable after a user turns on a power switch tends to increase. On the other hand, there is a speed-up startup technique using a suspend method in which electric current is kept passed through a main memory when a user turns off a power switch.

In this suspend method, a state when a power switch is turned off is stored, and at next startup, the apparatus is returned to the stored state, but at this time, a control program is not reset, and hence memory may become increasingly fragmented.

As a technique to solve this problem, there is a hibernation startup technique according to which a memory image at the start of operation is stored in a storage device as a snap shot called as a hibernation image, and at startup, the snapshot is transferred to memory, enabling high-speed startup. According to this hibernation startup technique, however, operation cannot be started unless a hibernation image has been created.

For this reason, there are many cases where such apparatuses as image processing apparatuses in which a variety of hardware and software options can be added and deleted, and initialization sequences, initial screens, and so on are changed cannot be started using a hibernation image. Thus, the hibernation startup technique is not suitable for image processing apparatuses.

To solve this problem, there has been disclosed a technique that creates a hibernation image again when changing hardware and software configurations (see, for example, Japanese Laid-Open Patent Publication (Kokai) No. 2012-18554). Specifically, according to this technique, a hibernation image is divided into a common part and an optional part, and all the images are stored in a storage device in advance. By optional settings, combinations of images in the optional part are determined at previous termination or at startup to create the entire hibernation image.

To solve the above problem, there has also been disclosed a technique that deletes a hibernation image when changing software configurations (see, for example, Japanese Laid-Open Patent Publication (Kokai) No. 2013-004044). Specifically, according to this technique, when such a change in software that it can be determined that a stored hibernation image is unusable, the stored hibernation image is deleted, and at next startup, no hibernation image is used.

According to the technique disclosed in Japanese Laid-Open Patent Publication (Kokai) No. 2012-18554, it is possible to cope with configuration changes by detecting changes in the configurations of hardware and software and combining hibernation images stored in advance to create the entire hibernation image.

According to this technique disclosed in Japanese Laid-Open Patent Publication (Kokai) No. 2013-004044, a hibernation image is deleted when the configuration of software is changed, and cold booting (normal startup) is forced to be performed at next startup, so that mismatch between user settings and a hibernation image can be avoided.

According to the technique disclosed in Japanese Laid-Open Patent Publication (Kokai) No. 2012-18554, however, imagining all patterns and storing partial hibernation images in advance is not efficient because many optional functions can be added or deleted in an image processing apparatus. Moreover, according to this method, managing many versions and keeping consistency of versions are difficult. Further, according to the technique disclosed in Japanese Laid-Open Patent Publication (Kokai) No. 2013-004044, it is impossible to cope with changes in device configuration.

Thus, the hibernation function according to the prior arts has the problem of not being able to support device connection states which are different at power-off and at next startup.

SUMMARY OF THE INVENTION

The present invention provides an image forming apparatus, which has a hibernation function and is capable of selecting a suitable startup method even in a case where device connection states are different at power-off and at next startup, a control method therefor, and a computer-readable storage medium storing a program for implementing the control method.

Accordingly, a first aspect of the present invention provides an image forming apparatus to which a device is connectable and which has a hibernation function, comprising a creation unit configured to create a hibernation image based on data stored in a memory of the image forming apparatus, a first obtaining unit configured to obtain a first device connection state indicative of whether the device is connected to the image forming apparatus, a storage unit configured to store, in a storage section, the first device connection state obtained by the first obtaining unit and the hibernation image created by the creation unit, a second obtaining unit configured to store a second device connection state indicative of whether the device is connected to the image forming apparatus when power to the image forming apparatus is turned off and the power is turned on again after the first device connection state and the hibernation image are stored in the storage section by the storage unit, a cold boot unit configured to, when the first device connection state and the second device connection state are different, start the image forming apparatus without using the hibernation image stored in the storage section, and a hibernation startup unit configured to, when the first device connection state and the second device connection state are the same, start the image forming apparatus using the hibernation image stored in the storage section.

Accordingly, a second aspect of the present invention provides a control method for an image forming apparatus to which a device is connectable and which has a hibernation function, comprising a creation step of creating a hibernation image based on data stored in a memory of the image forming apparatus, a first obtaining step of obtaining a first device connection state indicative of whether the device is connected to the image forming apparatus, a storage step of storing, in a storage section, the first device connection state obtained in the first obtaining step and the hibernation image created in the creation step, a second obtaining step of storing a second device connection state indicative of whether the device is connected to the image forming apparatus when power to the image forming apparatus is turned off and the power is turned on again after the first device connection state and the hibernation image are stored in the storage section in the storing step, a cold boot step of, when the first device connection state and the second device connection state are different, starting the image forming apparatus without using the hibernation image stored in the storage section, and a hibernation startup step of, when the first device connection state and the second device connection state are the same, starting the image forming apparatus using the hibernation image stored in the storage section.

Accordingly, a third aspect of the present invention provides a non-transitory computer-readable storage medium storing a program for causing a computer to implement a control method for an image forming apparatus to which a device is connectable and which has a hibernation function, comprising creation step of creating a hibernation image based on data stored in a memory of the image forming apparatus, a first obtaining step of obtaining a first device connection state indicative of whether the device is connected to the image forming apparatus, a storage step of storing, in a storage section, the first device connection state obtained in the first obtaining step and the hibernation image created in the creation step, a second obtaining step of storing a second device connection state indicative of whether the device is connected to the image forming apparatus when power to the image forming apparatus is turned off and the power is turned on again after the first device connection state and the hibernation image are stored in the storage section in the storing step, a cold boot step of, when the first device connection state and the second device connection state are different, starting the image forming apparatus without using the hibernation image stored in the storage section, and a hibernation startup step of, when the first device connection state and the second device connection state are the same, starting the image forming apparatus using the hibernation image stored in the storage section.

According to the present invention, when the power to the image forming apparatus is turned off and the power to the image forming apparatus is turned on again after the first device connection state and the hibernation image are stored, the second device connection state is obtained, and when the first device connection state and the second device connection state are different, the image forming apparatus is started without using the hibernation image, and when the first device connection state and the second device connection state are the same, the image forming apparatus is started using the hibernation image. Thus, even when the first device connection state and the second device connection state are different at power-off and at next startup, inconsistency between the connection states and the hibernation image stored in the storage section can be avoided.

Further features of the present invention will become apparent from the following description of exemplary embodiments (with reference to the attached drawings).

BRIEF DESCRIPTION OF THE DRAWINGS

FIG. 3 is a diagram schematically showing an arrangement of a power-supply unit in FIG. 1.

FIG. 4A is a view showing connection states of devices connected to a main board in FIG. 2, and FIG. 4B is a view showing connection states of devices connected to a sub board in FIG. 2.

FIG. 5A is a flowchart showing the procedure of a suspending process according to a prior art, FIG. 5B is a flowchart showing the procedure of a hibernation process according to a prior art, and FIG. 5C is a flowchart showing the procedure of a device connection state storage process carried out by CPUs in FIG. 2.

DESCRIPTION OF THE EMBODIMENTS

The present invention will now be described in detail with reference to the drawings showing an embodiment thereof.

Figure 1:
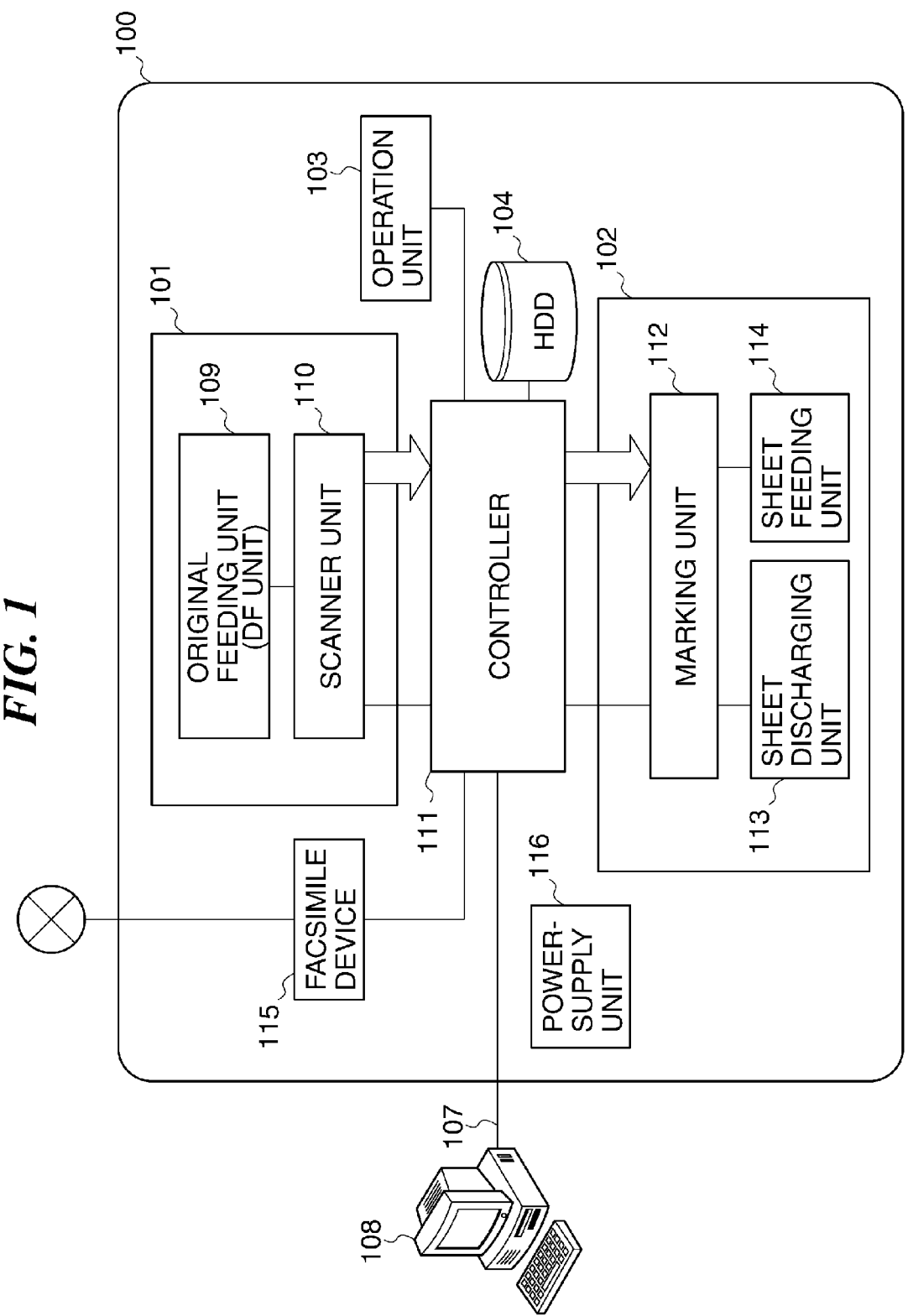
FIG. 1 is a diagram schematically showing an arrangement of an image forming apparatus according to an embodiment of the present invention.

FIG. 1 is a diagram schematically showing an arrangement of an image forming apparatus 100 having a hibernation function according to an embodiment of the present invention.

Referring to FIG. 1, the image forming apparatus 100 is comprised of a controller 111, a scanner device 101, a printer device 102, a facsimile device 115, an operation unit 103, an HDD 104, and a power-supply unit 116. The image forming apparatus 100 is connected to a PC 108 via a LAN 107. The controller 111 controls the overall operation of the image forming apparatus 100. An arrangement of the controller 111 will be described later.

The scanner device 101 has an original feeding unit 109, which is capable of automatically and successively switching bundles of originals, and a scanner unit 110 which is capable of optically reading an image off an original and converting the image into image data. The image data is sent to the controller 111.

The printer device 102 has a sheet feeding unit 114, which is capable of successively feeding sheets one by one from a sheet bundle, a marking unit 112 for printing image data on fed sheets, and a sheet discharging unit 113 for discharging sheets after printing. The printer device 102 performs printing in response to a request from the PC 108, and prints image data read by the scanner device 101.

The operation unit 103, which is a touch panel, receives a request from a user and displays a user interface suited to a function process. The HDD 104 stores image data obtained by the scanner device 101, control programs, startup files for determining initialized states of the respective devices, and so on. The facsimile device 115 sends and receives image data to and from external apparatuses using a telephone line. The power-supply unit 116 supplies power to components of the image forming apparatus 100. An arrangement of the power-supply unit 116 will be described later.

With the arrangement described above, the image forming apparatus 100 has a copying function of storing image data, which is obtained by the scanner device 101 scanning in an original, in the HDD 104, and at the same time, performing printing using the printer device 102. The image forming apparatus 100 also has an image sending function of sending image data, which is obtained by the scanner device 101 scanning in an original, to the PC 108 via the LAN 107.

Further, the image forming apparatus 100 has an image storage function of storing image data, which is obtained by the scanner device 101 scanning in an original, in the HDD 104 and performing transmission of image data and printing of image data as the need arises. The image forming apparatus 100 also has an image printing function of analyzing, for example, a page description language, which is sent from the PC 108, and performing printing using the printer device 102.

Figure 2:
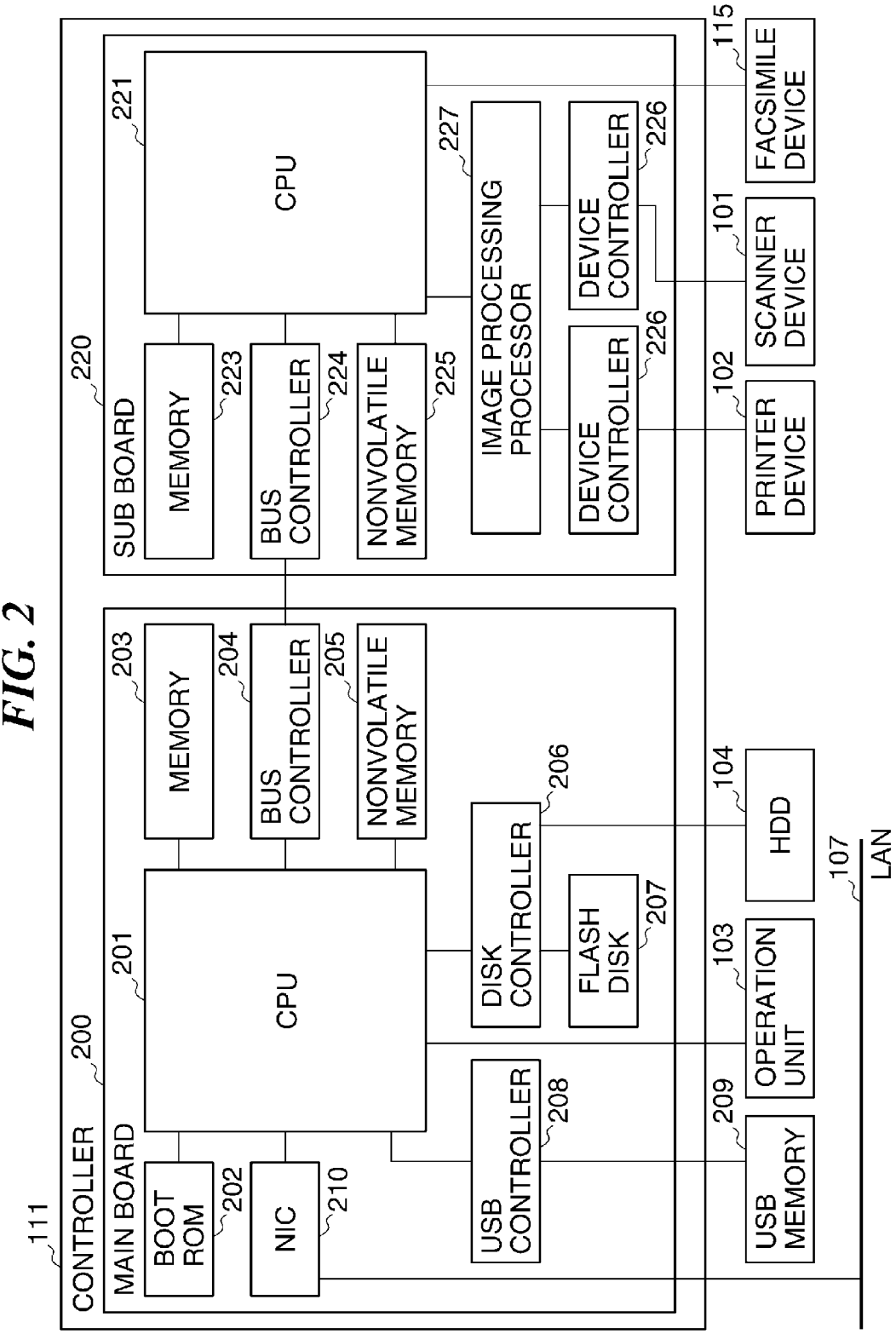
FIG. 2 is a diagram schematically showing an arrangement of a controller in FIG. 1.

FIG. 2 is a diagram schematically showing an arrangement of the controller 111 in FIG. 1.

Referring to FIG. 2, the controller 111 is comprised of a main board 200 and a sub board 220. The main board 200 is comprised of a universal CPU system and has a CPU 201 which controls the overall operation of the main board 200. A boot ROM 202 stores a boot program and others.

A memory 203, which is connected to the CPU 201, is used as a work memory by the CPU 201, and a variety of data is stored in the memory 203. A plurality of memories 203 may be installed so as to enlarge capacity. A bus controller 204, which is connected to the CPU 201, acts as a bridge to an external bus. A nonvolatile memory 205, which is connected to the CPU 201, holds information even after the power is turned off.

A disk controller 206, which is connected to the CPU 201, controls access to an HDD 104, and a flash disk 207 such as an SSD, which is a storage device with relatively small capacity comprised of a semiconductor device. A USB controller 208, which is connected to the CPU 201, controls access to a USB memory 209, and other devices which are connectable via a USB. A NIC 210, which is connected to the CPU 201, controls transmission and reception of data to and from the LAN 107. The operation unit 103 is connected to the CPU 201 as shown in the figure.

The sub board 220, which is comprised of a relatively small universal CPU system, has a CPU 221 which controls the overall operation of the sub board 220. A memory 223, which is connected to the CPU 221, is used as a work memory by the CPU 221, and a variety of data is stored in the memory 223.

A bus controller 224, which is connected to the CPU 221, acts as a bridge to an external bus. A nonvolatile memory 225, which is connected to the CPU 221, holds information even after the power is turned off.

An image processing processor 227, which is connected to the CPU 221, carries out real-time digital image processing. Device controllers 226, which are connected to the image processing processor 227, exchange image data with the scanner device 101 and the printer device 102. The facsimile device 115 is connected to the CPU 221 as shown in the figure.

It should be noted that both of the CPUs 201 and 221 have a number of CPU peripheral hardware pieces such as a chipset, a bus bridge, and a clock generator, but they are omitted from the figure.

A description will now be given of the operation of the controller 111 described above by taking a copying function as an example.

When a user gives an instruction to copy an image via the operation unit 103, the CPU 201 sends an image reading instruction to the scanner device 101 via the CPU 221 of the sub board 220. The scanner device 101 inputs image data, which is obtained by scanning in an original, to the image processing processor 227 via the device controller 226. The image processing processor 227 carries out DMA transfer to the memory 223 via the CPU 221 to temporarily store the image data.

Upon ascertaining that a predetermined amount or all of the image data has been stored in the memory 223, the CPU 201 gives a print instruction to the printer device 102 via the CPU 221. The CPU 221 notifies the image processing processor 227 of a location of the image data in the memory 223, and in accordance with a synchronization signal from the printer device 102, sends the image data stored in the memory 223 to the printer device 102 via the image processing processor 227 and the device controller 226. The printer device 102 prints the image data as a copy image on a recording medium.

Here, in the case of making multiple copies, the CPU 201 stores, in the HDD 104, the image data in the memory 223. As a result, during printing to make the second and subsequent copies, the image data stored in the HDD 104 can be synchronously sent to the printer device 102 without obtaining image data from the scanner device 101.

Flowcharts according to the present embodiment which will be described later are executed by the CPU 201 and the CPU 221. A boot loader program, an operating system, firmware, applications, and so on are stored in advance in the boot ROM 202, the flash disk 207, and the HDD 104.

Among the component elements described above, the scanner device 101, the printer device 102, the facsimile device 115, devices connected to the disk controller 206 and the USB controller 208, the memories 203 and 223, and the NIC 210 are referred to sometimes as devices.

As shown in FIG. 2, the image forming apparatus 100 according to the present embodiment has the main board 200 and the sub board 220. Namely, the image forming apparatus 100 has a plurality of CPU systems to which the devices can be connected.

FIG. 3 is a diagram schematically showing an arrangement of the power-supply unit 116 in FIG. 1.

Referring to FIG. 3, the power-supply unit 116 is comprised of a toggle-type switch 301 and a power-supply unit 302. The power-supply unit 302 has an AC-DC converter 303.

AC Power is input to the AC-DC converter 303 via a power cable 304. Power cables 305, 306, and 309 supply DC power to the printer device 102, the controller 111, and the scanner device 101, respectively from the AC-DC converter 303. A control line 307 notifies the controller 111 of a state of the toggle-type switch 301. A power-supply remote signal line 308 controls output of the AC-DC converter 303.

By operating the toggle-type switch 301, a user can turn on or off the power to the image forming apparatus 100. When the toggle-type switch 301 is on, the toggle-type switch 301 is connected to the AC-DC converter 303, and hence the image forming apparatus 100 is energized.

When the toggle-type switch 301 is turned off, the supply of DC power to the controller 111 via the power cable 306 is continued until shutdown of the image forming apparatus 100 is completed.

Specifically, control is carried out such that the controller 111 is notified of a state of the toggle-type switch 301 via the control line 307, and after shutdown of the image forming apparatus 100 is completed, the controller 111 notifies the AC-DC converter 303 of a power-supply remote signal via the power-supply remote signal line 308, causing the supply of power to the controller 111 via the power cable 306 to be turned off.

It should be noted that the toggle-type switch 301 is configured as a switch which continues to be mechanically held in an ON state or an OFF state. By putting the toggle-type switch 301 down to an ON or OFF side, the user can instruct the image forming apparatus 100 to turn on or off the power.

Although in the present embodiment, the toggle-type switch which is explicitly in the off state and the on state is used, a number of apparatuses such as personal computers have a switch which is not explicitly in an on state and an off state and functions as a power-saving shift switch. The switch that does not have these states has a control pattern in which it functions to "instruct shifting into an off/power-saving state" in a first state in which power is on, and functions as being "on" in a second state in which power is off. The switch also has a control pattern such as inputting "forced OFF" by continuously depressing the switch for a predetermined period of time or longer.

If the present embodiment is applied to a switch that does not have states, turning on-off of the toggle-type switch 301 should be applied to the on-off control pattern in the first state and the second state described above.

FIG. 4A is a view showing connection states of devices which are connected to the main board 200 in FIG. 2 and have an effect on a hibernation image, and FIG. 4B is a view showing connection states of devices which are connected to the sub board 220 in FIG. 2 and have an effect on process control.

In the present embodiment, a hibernation image is created, a device connection state indicative of whether or not a device is connected to the image forming apparatus 100 is obtained, and the hibernation image and the device connection state are stored in the flash disk 207 (storage unit). The device connection state stored at this time is a device connection state stored at immediately-preceding startup, that is, at previous startup, and hence, in the figure, the expression "last time" is used.

Then, at startup of the image forming apparatus 100, a device connection state is obtained again and compared with the device connection state stored in the flash disk 207. The device connection state stored at this time is a device connection state obtained at startup this time, and hence in the figure, the expression "this time" is used. A first device connection state, to be described later, corresponds to the device connection state "last time". A second device connection state corresponds to the device connection state "this time".

Referring to FIGS. 4A and 4B, device connection states are expressed by combinations of a device name and a serial number. For example, in FIG. 4A, a flash disk with a serial number "FLASH111" is connected as a device "DISK1".

Devices whose serial number fields are blank indicate that they are not connected. For example, in a device connection state obtained last time in FIG. 4B, nothing is connected as a device "facsimile".

Further, when "last time" and "this time" are compared with each other in FIG. 4A, it is recognized that DISK2 and DRAM2 are newly connected. Namely, in all of device connection states in FIGS. 4A and 4B, connected or disconnected devices can be known by comparing the device connections states "last time" and "this time".

Further, when devices which are connected last time and this time are the same, but a remodeled device is newly connected, or an HDD or RAM with a different storage size is newly connected, replacement of devices can be known by different serial numbers. Thus, in the present embodiment, when "last time" and "this time" are the same, this means not only whether devices are connected or not connected but also their serial numbers are the same.

In the following description, when nothing was connected "last time" but a device is connected "this time", this is expressed as "a new device has been connected", and when a device with a serial number different from that of a device connected "last time" is connected "this time", this is expressed as "a device has been replaced".

A description will now be given of processes carried out by the image forming apparatus 100 with description of prior arts.

FIG. 5A is a flowchart showing the procedure of a conventional suspending process according to a prior art, FIG. 5B is a flowchart showing the procedure of a conventional hibernation process according to a prior art, and FIG. 5C is a flowchart showing the procedure of a device connection state storage process carried out by the CPUs 201 and 221 of the controller 111 in FIG. 2.

Referring to FIG. 5A, by operating a specific switch, the user issues a suspending request instruction (step S401). Then, a suspend image is created based on information stored in a volatile memory at present, and stored in the volatile memory (step S402), and the apparatus shifts into a suspended state (step S403).

The stored suspended image does not disappear because electric current is passed through the volatile memory while the apparatus lies in the suspended state. By operating a specific switch, the user issues a suspend return request instruction (step S404), and the apparatus returns to a state before the suspended state using the suspend image stored in the step S402 (step S405), followed by termination of the present process.

Thus, in the conventional suspending process, a suspend image is created and stored in a volatile memory immediately before shifting into a suspended state, and at the time of return, the apparatus returns to a state before suspending using the stored suspend image. In a suspended state, electric current is passed through only a specific volatile memory, and hence power needs to be supplied to a suspended apparatus. Namely, the power cannot be turned off. Thus, a device cannot be attached or removed while an apparatus is suspended.

Referring now to FIG. 5B, a description will be given of the conventional hibernation process according to the prior art.

Referring to FIG. 5B, by operating a specific switch, the user issues a power-off request instruction (step S501). Then, a hibernation image is created based on information stored in a volatile memory at present, and stored in an HDD (step S502), and the apparatus shifts into a power-off state (step S503).

Then, by operating a specific switch, the user issues a power-on request instruction (step S504), and the apparatus is started using the hibernation image stored in the step S502 (step S505), followed by termination of the present process.

Thus, in the conventional hibernation process as well, as with the conventional suspending process, a memory image before shifting into a suspended state or a power-off state is stored, and at the time of return or startup, the apparatus is returned or started using the stored memory image. It should be noted that in a power-off state during the hibernation process, the power does not need to be supplied unlike a suspended state.

In general, creating a hibernation image of a personal computer or the like does not take long because it is not large in size as compared with that of an image forming apparatus. For this reason, creating an image whenever the power is turned off will not take such a long time that a user complains. On the other hand, in an image forming apparatus, it takes several times as long to create an image as it does in a personal computer, and hence creating a hibernation image whenever the power is turned off is not realistic. Accordingly, in the present embodiment, a hibernation image is created at startup, not at power-off, so that a user does not have to wait when the power is turned off, and as a result, convenience for the user is enhanced.

Referring now to FIG. 5C, a description will be given of the device connection state storage process according to the present embodiment.

Referring to FIG. 5C, the controller 111 creates a hibernation image (step S601: creation unit) and stores the created hibernation image in the flash disk 207 (step S602).

The controller 111 then obtains device connection states (first device connection states) described with reference to FIG. 4 for respective ones of the main board 200 and the sub board 220 (step S603: first obtaining unit), stores the obtained device connection states in the flash disk 207 for the main board 200 and the sub board 220 (step S604), and terminates the present process.

The steps S602 and S604 correspond to a storage unit that stores first device connection states and a hibernation image in the flash disk 207 which is the storage section.

By the device connection state storage process described above, a hibernation image and device connection states of the respective boards are stored in the storage section. Specifically, device connection states "last time" described above with reference to FIGS. 4A and 4B are stored in the storage section.

Figure 6:
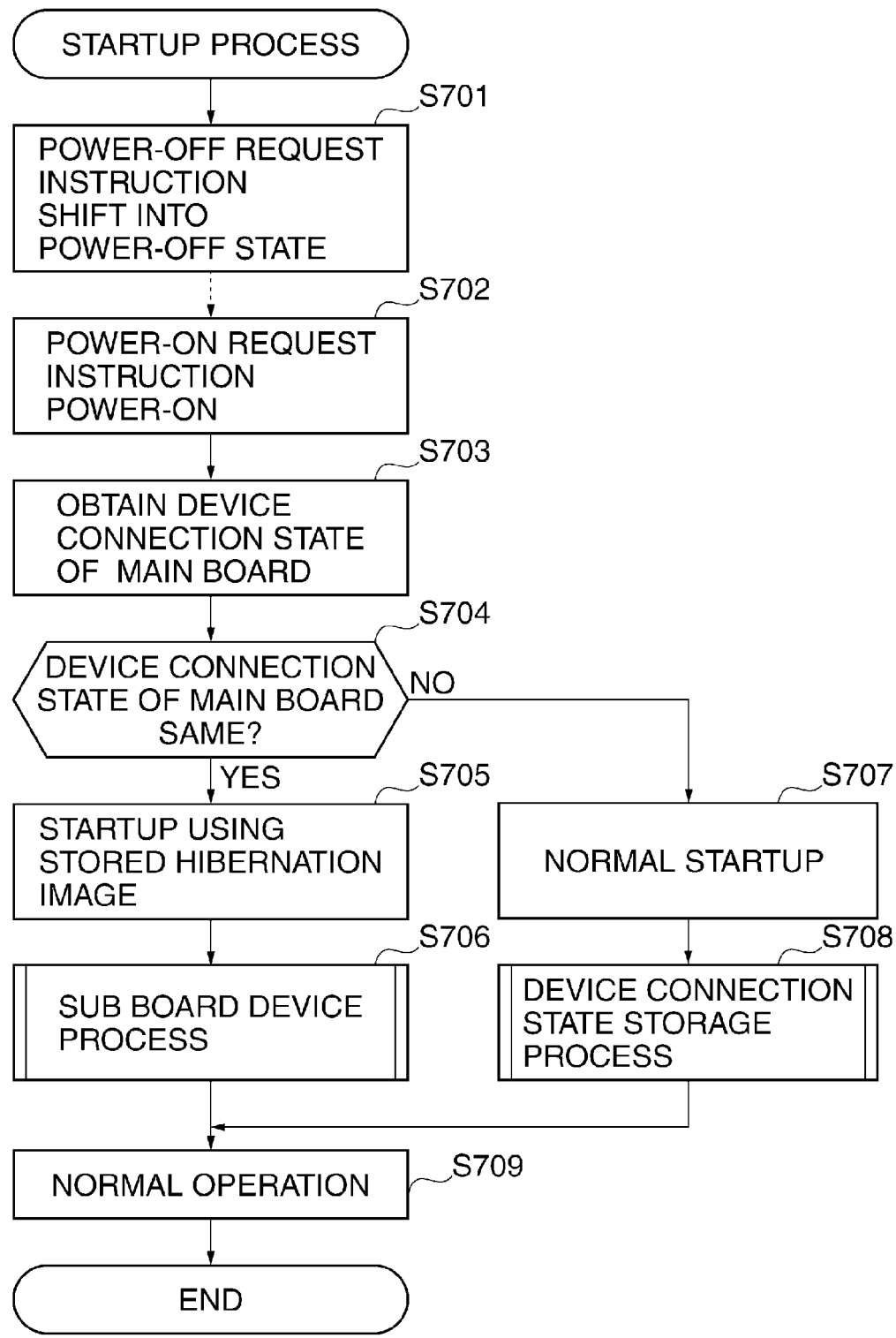
FIG. 6 is a flowchart showing the procedure of an activation process carried out by the CPUs in FIG. 2.

FIG. 6 is a flowchart showing the procedure of a startup process carried out by the CPUs 201 and 221 of the controller 111 in FIG. 2.

Referring to FIG. 6, in response to a power-off request instruction issued by the user operating the toggle-type switch 301, the controller 111 causes the image forming apparatus 100 to shift into a power-off state (step S701). The controller 111 then turns on the power to the image forming apparatus 100 in response to a power-on request instruction issued by the user operating the toggle-type switch 301 (step S702).

The controller 111 obtains a device connection status of the main board 200 using a loader that loads an operation system stored in the boot ROM 202 (step S703: second obtaining unit). Specifically, based on devices indicated by device connection states described above with reference to FIGS. 4A and 4B, serial numbers received from the respective devices are obtained in the main board 200. Thus, a device connection state "this time" (second device connection states) in FIG. 4A are obtained.

The controller 111 then compares the obtained device connection state "this time" on the main board 200 with the device connection state "last time" on the main board 200 stored in the step S604 in FIG. 5C. The controller 111 then determines whether or not the device connection states of the main board 200 "last time" and "this time" are the same (step S704).

As a result of the determination in the step S704, when the device connection states are the same (YES in the step S704), the controller 111 performs hibernation-startup of the image forming apparatus 100 using the hibernation image stored in the step S602 in FIG. 5C (step S705: hibernation startup unit). Specifically, the loader designates the hibernation image stored in the step S602 and starts up the operation system in a hibernation mode.

Thus, whether or not to perform hibernation-startup is determined before the operation system is started up. In an ordinary startup sequence, the loader runs to start up the operation system, and after the operation system is started up, applications and firmware start and run.

Next, a sub board device process relating to devices connected to the sub board 220, to be described later, is carried out (step S706), and the image forming apparatus 100 shifts to normal operation (step S709), followed by termination of the present process.

It should be noted that device connection states that can be obtained from the loader are limited to those of devices connected to the main board 200, and hence the process in the step S706 cannot be performed by the loader. Thus, as indicated in a sub board device process which will be described later with reference to FIG. 7, a device connection state relating to the sub board 220 are obtained after the sub board 220 is activated.

Returning to the step S704, when as a result of the determination in the step S704, the device connection states are different (NO in the step S704), the controller 111 normally starts (cold boots) the image forming apparatus 100 (step S707: cold boot unit) and carries out the device connection state storage process described above with reference to FIG. 5C (step S708) and shifts to normal operation (step S709), followed by termination of the present process.

When the image forming apparatus 100 is started by cold booting, the controller 111 creates a hibernation image, obtains a first device connection state, and stores the first device connection states and the hibernation image in the flash disk 207, which is the storage section, in the step S708.

Figure 7:
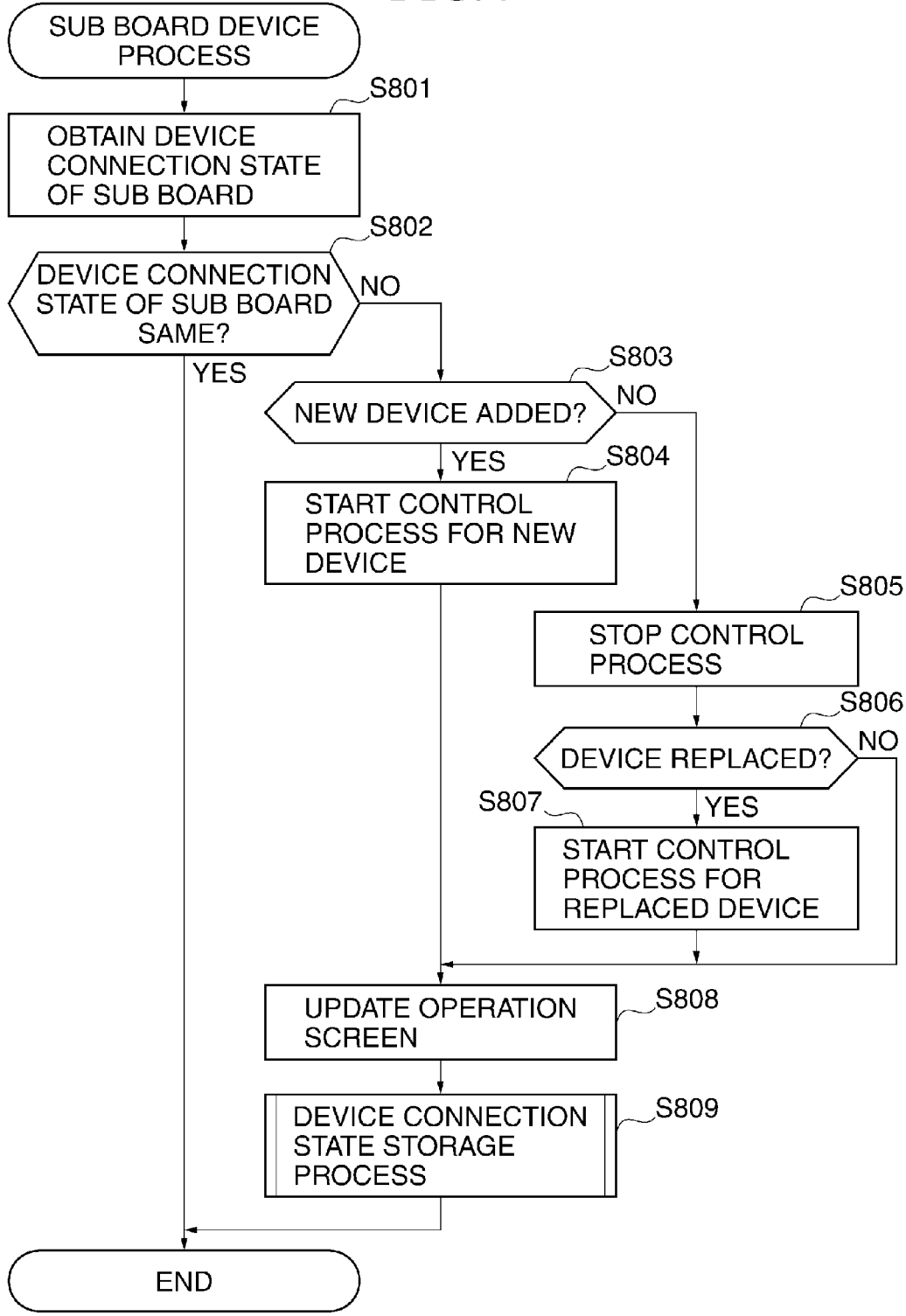
FIG. 7 is a flowchart showing the procedure of a sub board device process in step S706 in FIG. 6.

FIG. 7 is a flowchart showing the procedure of the sub board device process in the step S706 in FIG. 6.

Referring to FIG. 7, the controller 111 obtains a device connection state of the sub board 220 (step S801). Specifically, based on devices indicated by a device connection state described above with reference to FIGS. 4A and 4B, serial numbers received from the respective devices are obtained in the sub board 220. Thus, The device connection state "this time" in FIG. 4B is obtained.

The controller 111 then compares the device connection state obtained "this time" with the device connection state "last time" of the sub board 220 stored in the step S604 in FIG. 5C. The controller 111 then determines whether or not the device connection states of the sub board 220 "last time" and "this time" are the same (step S802).

As a result of the determination in the step S802, when the device connection states are the same (YES in the step S802), the controller 111 terminates the present process. On the other hand, as a result of the determination in the step S802, when the device connection states are different (NO in the step S802), the controller 111 determines whether or not a new device has been connected to the sub board 220 (step S803).

As a result of the determination in the step S803, when a new device has been connected to the sub board 220 (YES in the step S803), the controller 111 starts a control process for controlling the added device (step S804).

The controller 111 then updates the operation screen displayed on the operation unit 103 to a screen suited to the connected device (step S808) and carries out the device connection state storage process described above with reference to FIG. 5C (step S809), followed by terminating the present process. How the operation screen is updated will be concretely described later.

Returning to the step S803, when as a result of the determination in the step S803, a new device has not been connected to the sub board 220 (NO in the step S803), the controller 111 stops a control process for controlling a device which was connected "last time" but is not connected "this time" (step S805).

The controller 111 then determines whether or not a device has been replaced (step S806). As a result of the determination in the step S806, when a device has not been replaced (NO in the step S806), the process proceeds to the step S808. On the other hand, as a result of the determination in the step S806, when a device has been replaced (YES in the step S806), the controller 111 starts a control process for controlling the replaced device (step S807), and the process proceeds to the step S808.

How the operation screen is updated in the step S808 will now be concretely described. A screen on the operation unit 103 is displayed using a hibernation image created before a new device is connected to the sub board 220 or before a device is replaced. Thus, when a new facsimile is additionally connected to, for example, the sub board 220, there is a possibility that an operation screen for the facsimile is not displayed on the operation unit 103. For this reason, the operation screen is updated again.

On the other hand, similarly in a case where a device is disconnected from the sub board 220, there is a possibility that an operation screen for the disconnected device is displayed, or in a case where a device is replaced, there is possibility that an operation screen for a device having different functions and component elements is displayed. For this reason, the operation screen needs to be updated to a suitable operation screen.

As indicated in the steps S804 and S807, when the first device connection state and the second device connection state are different because a new device has been connected to the sub board 220 or a device has been replaced, the controller 111 starts the control process for controlling the new device or the replaced device.

On the other hand, as indicated in the step S805, when the first device connection state and the second device connection state are different because a device has been disconnected from the sub board 220, the controller 111 stops the control process for controlling the disconnected device.

Moreover, as indicated in the processes in FIGS. 6 and 7, when the image forming apparatus 100 has a plurality of CPU systems to which devices are connectable, the first device connection state and the second device connection state are obtained with respect to each of the CPU systems.

As described above, the image forming apparatus according to the present embodiment can avoid mismatch of hibernation images by obtaining connection states of devices at startup, and when the connection states are different from previous ones, performing cold-booting. When cold-booting is performed, a hibernation image is newly created after startup, and therefore, all device connection states can be flexibly supported.

According to the present embodiment described above, after a first device connection state and a hibernation image are stored, the power to the image forming apparatus is turned off, and when the power to the image forming apparatus is turned on again, a second device connection state is obtained (step S703). When the first device connection state and the second device connection state are different (NO in the step S704), the image forming apparatus is started without using the hibernation image (step S707). On the other hand, when the first device connection state and the second device connection state are the same (YES in the step S704), the image forming apparatus is started using the hibernation image (step S705), and therefore, even when a device connection state is different from a previous one, all connection states can be supported.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-111952, filed May 28, 2013, which is hereby incorporated by reference herein in its entirety.

What is claimed is:

1. An image forming apparatus to which a device is connectable, comprising:
 a processor; and
 a memory storing instructions which, when executed by the processor, cause the image forming apparatus to function as:
 a creation unit configured to create a hibernation image based on data stored in a memory of the image forming apparatus;
 a first obtaining unit configured to obtain a first device connection state indicating a device connection state at a timing of turning off the image forming apparatus;
 a second obtaining unit configured to obtain a second device connection state indicating a device connection state at a timing of turning on the image forming apparatus; and
 a control unit configured to start the image forming apparatus by using the hibernation image, in a case that the second device connection state corresponds to the first device connection state, and start the image forming apparatus without a hibernation image, in a case that the second device connection state does not correspond to the first device connection state.

2. The image forming apparatus according to claim 1, wherein when the image forming apparatus is started, said creation unit creates the hibernation image again, and said first obtaining unit obtains the first device connection state again.

3. The image forming apparatus according to claim 1, wherein in a case that the second device connection state does not correspond to the first device connection state because a device has been disconnected from the image forming apparatus, a control process for controlling the disconnected device is stopped, and
 in a case that the second device connection state does not correspond to the first device connection state because a device has been replaced or a new device has been connected to the image forming apparatus, a control process for controlling the replaced device or the new device is started.

4. The image forming apparatus according to claim 1, further comprising a plurality of CPU systems to which a device can be connected, wherein the first device connection state and the second device connection state are obtained with respect to each of the plurality of CPU systems.

5. A control method for an image forming apparatus to which a device is connectable, comprising:

a creation step of creating a hibernation image based on data stored in a memory of the image forming apparatus;

a first obtaining step of obtaining a first device connection state indicating a device connection state at a timing of turning off the image forming apparatus;

a second obtaining step of obtaining a second device connection state indicating a device connection state at a timing of turning on the image forming apparatus; and a control step of starting the image forming apparatus by using the hibernation image, in a case that the second device connection state corresponds to the first device connection state, and starting the image forming apparatus without a hibernation image, in a case that the second device connection state does not correspond to the first device connection state.

6. The control method according to claim 5, wherein when the image forming apparatus is started, the hibernation image is created again in said creation step, and the first device connection state is obtained again in said first obtaining step.

7. The control method according to claim 5, wherein in a case that the second device connection state does not correspond to the first device connection state because a device has been disconnected from the image forming apparatus, a control process for controlling the disconnected device is stopped, and in a case that the second device connection state does not correspond to the first device connection state because a device has been replaced or a new device has been connected to the image forming apparatus, a control process for controlling the replaced device or the new device is started.

8. The control method according to claim 5, wherein, when there is a plurality of CPU systems to which a device is connectable, the first device connection state and the second device connection state are obtained with respect to each of the plurality of CPU systems.

9. A non-transitory computer-readable storage medium storing a program for causing a computer to implement a control method for an image forming apparatus to which a device is connectable, the method comprising:

a creation step of creating a hibernation image based on data stored in a memory of the image forming apparatus;

a first obtaining step of obtaining a first device connection state indicating a device connection state at a timing of turning off the image forming apparatus;

a second obtaining step of obtaining a second device connection state indicating a device connection state at a timing of turning on the image forming apparatus; and a control step of starting the image forming apparatus by using the hibernation image, in a case that the second device connection state corresponds to the first device connection state, and startig the image forming apparatus without a hibernation image, in a case that the second device connection state does not correspond to the first device connection state.

10. The storage medium according to claim 9, wherein when the image forming apparatus is started, the hibernation image is created again in said creation step, and the first device connection state is obtained again in said first obtaining step.

11. The storage medium according to claim 9, wherein in a case that the second device connection state does not correspond to the first device connection state because a device has been disconnected from the image forming apparatus, a control process for controlling the disconnected device is stopped, and in a case that the second device connection state does not correspond to the first device connection state because a device has been replaced or a new device has been connected to the image forming apparatus, a control process for controlling the replaced device or the new device is started.

12. The storage medium according to claim 9, wherein, when there is a plurality of CPU systems to which a device is connectable, the first device connection state and the second device connection state are obtained with respect to each of the plurality of CPU systems.

* * * * *